J. H. SEETON.
NUT LOCK.
APPLICATION FILED JUNE 22, 1910.
998,409.
Patented July 18, 1911.
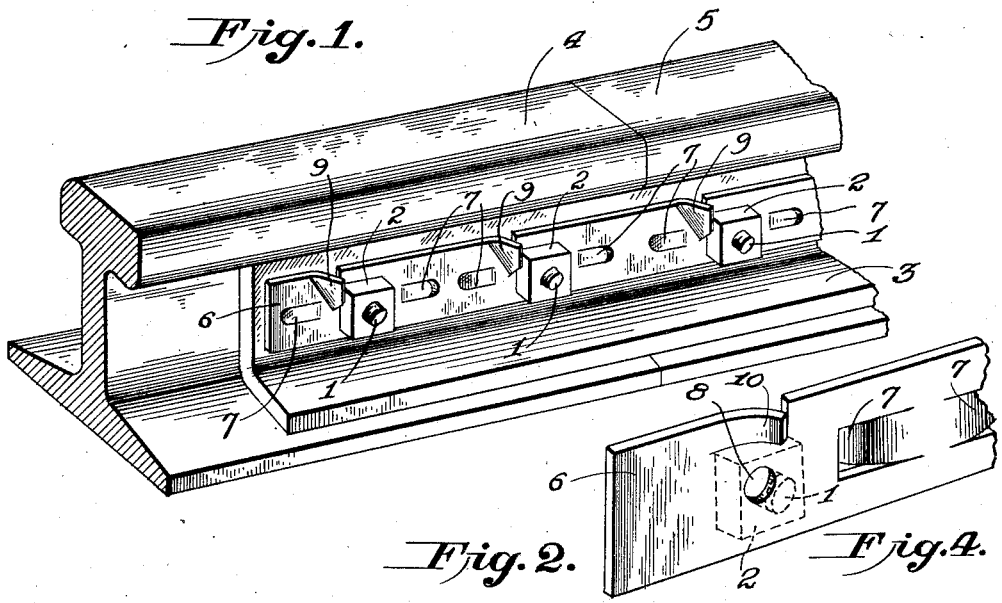
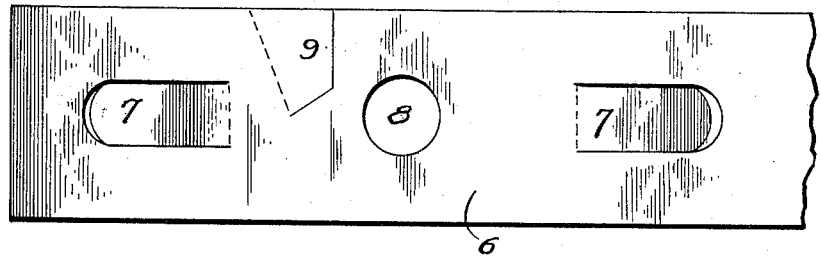
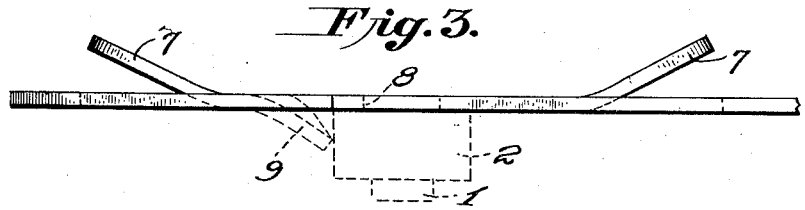
Witnesses
Inventor
James H. Seeton,
By E. E. Vrooman,
his Attorney.
COLUMBIA PLANOGRAPH CO., WASHINGTON, D. C.

UNITED STATES PATENT OFFICE.

JAMES H. SEETON, OF TYLER, TEXAS.

NUT-LOCK.

998,409. Specification of Letters Patent. Patented July 18, 1911.

Application filed June 22, 1910. Serial No. 568,327.

*To all whom it may concern:*

Be it known that I, JAMES H. SEETON, a citizen of the United States of America, residing at Tyler, in the county of Smith and State of Texas, have invented certain new and useful Improvements in Nut-Locks, of which the following is a specification, reference being had therein to the accompanying drawing.

This invention relates to nut locks especially adapted for use in connection with rail joints, and the principal object of the same is to provide a locking plate that will overlap the meeting ends of a rail joint and be held in yieldable contact with the webs of the rails by means of the fastening bolts, said plate being provided with means which engage the nuts of the fastening bolts so that rotation thereof is prevented.

In carrying out the objects of the invention generally stated above it will be understood, of course, that the essential features thereof are necessarily susceptible of changes in details and structural arrangements, certain practical embodiments of which are shown in the accompanying drawings, wherein:—

Figure 1 is a perspective view of a rail joint showing the practical application of the improved nut locking device. Fig. 2 is a fragmentary diagrammatic view of the locking plate. Fig. 3 is a top plan view, dotted lines being used to show its engagement with a nut. Fig. 4 is a detail fragmentary perspective view showing a variation of the nut engaging lip.

Referring to said drawings by numerals, it will be seen that the improved nut locking plate has been shown supported by the fastening bolts 1 and engaged with the nuts 2 that clamp the fish plate 3 in engagement with the rail ends 4—5. Said plate, which is designated by the numeral 6, is of sufficient length to overlap the rail ends 4—5 and has its central portion provided with a longitudinal row of spring tongues 7 that are provided by punching the tongues from the plate and bending said tongues outward so that they will contact with the fish plate 3 when the locking plate is clamped thereto and exert a pressure tending to force the locking plate from the fish plate. The locking plate is provided with opening 8 for the passage of the fastening bolts 1 and has one longitudinal edge provided with slitted portions which are at right angles to the longitudinal axis of the plate, the inner end of said slits being inclined, so that the slitted portions of the plate may be outturned to provide spring lips 9 that will have a flat surface for engagement with the flat sides of the nuts 2.

As is shown more clearly in Fig. 1, the lips 9 of plate 6 are formed so that as the nuts are tightened on their bolts, their corners will depress and ride over said lips, and immediately after the nuts have passed the lips, said lips will spring to their outwardly projecting position so that their flat surface will engage with one of the flat side surfaces of the nuts to prevent reverse movement thereof.

In the variation of the locking plate shown in Fig. 4, one of the longitudinal edges of the plate is provided with angular slits which provide spring lips 10 that engage with the flat upper side of the nuts. Said lips 10 are arranged so that their inner longitudinal edge engages with the nuts to prevent reverse movement thereof.

It will be seen from the foregoing that the invention is of such nature that it may be readily formed by a single operation of a suitable punching or stamping machine, thereby materially cheapening the cost of production.

What I claim as my invention is:—

A nut lock comprising an elongated flat plate, said plate having its central portion provided with a longitudinal row of regularly spaced integral outwardly projecting spring tongues, said plate being provided with a bolt opening arranged between each pair of spring tongues, said plate having its upper longitudinal edge portion provided with regularly spaced transverse slits, said slits terminating in inclined slits, said slitted portions being projected outward in a direction opposite to the direction in which the tongues project to provide a plurality of regularly spaced nut-engaging flat lips.

In testimony whereof I hereunto affix my signature in presence of two witnesses.

JAMES H. SEETON.

Witnesses:
F. R. HALL,
C. A. KAYEE.

Copies of this patent may be obtained for five cents each, by addressing the "Commissioner of Patents, Washington, D. C."